(12) United States Patent
Sakai et al.

(10) Patent No.: US 7,355,762 B2
(45) Date of Patent: Apr. 8, 2008

(54) IMAGE INPUTTING APPARATUS, METHOD, AND STORAGE MEDIUM RECORDING IMAGE INPUTTING PROGRAM

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1033 days.

(21) Appl. No.: 10/448,017

(22) Filed: May 30, 2003

(65) Prior Publication Data

US 2003/0223097 A1   Dec. 4, 2003

(30) Foreign Application Priority Data

May 31, 2002   (JP)   ............................. 2002-160212

(51) Int. Cl.
H04N 1/04   (2006.01)
H04N 1/40   (2006.01)
H04N 1/32   (2006.01)

(52) U.S. Cl. ...................... 358/474; 358/497; 358/444; 358/468

(58) Field of Classification Search ................ 358/474, 358/497, 444, 468
See application file for complete search history.

(56) References Cited

U.S. PATENT DOCUMENTS

| | | | |
|---|---|---|---|
| 5,809,278 A * | 9/1998 | Watanabe et al. ............ 711/150 |
| 6,700,684 B1 | 3/2004 | Chiba et al. | |
| 2003/0222201 A1 | 12/2003 | Chiba et al. | |
| 2003/0231355 A1 | 12/2003 | Ishikawa et al. | |

FOREIGN PATENT DOCUMENTS

| | | |
|---|---|---|
| EP | 0 953 932 | 5/2003 |
| JP | 03-250866 | 11/1991 |
| JP | 03-268573 | 11/1991 |
| JP | 05-130318 | 5/1993 |
| JP | 05-130320 | 5/1993 |
| JP | 06-121114 | 4/1994 |
| JP | 11-155063 | 6/1999 |
| JP | 11-220587 | 8/1999 |
| JP | 11-316798 | 11/1999 |
| JP | 11-338973 | 12/1999 |
| JP | 2002-027255 | 1/2002 |
| JP | 2004-7241 | 1/2004 |

* cited by examiner

Primary Examiner—Houshang Safaipour
(74) Attorney, Agent, or Firm—Staas & Halsey LLP

(57) ABSTRACT

A controlling unit of an image inputting apparatus increments a counter each time an instruction to start an image input is externally provided. An image compressing unit waits for the completion of the storage of an entire image in a buffer memory, and issues an instruction to detect the state of the image to an image state detecting unit. The image state detecting unit detects the rotation direction and the presence/absence of mirror-reversing of the image stored in the buffer memory, and notifies the detection result to an image compressing unit. The image compressing unit switches a scanning order of pixels to be read from the buffer memory based on the notification, compresses the image data while reading the image data in the switched scanning order, and stores the compressed image data in a data storing unit. After the entire image data within the buffer memory is stored in the image data storing unit, the lastly stored image data is decompressed by an image decompressing unit, and the decompressed image is displayed on a display.

12 Claims, 14 Drawing Sheets

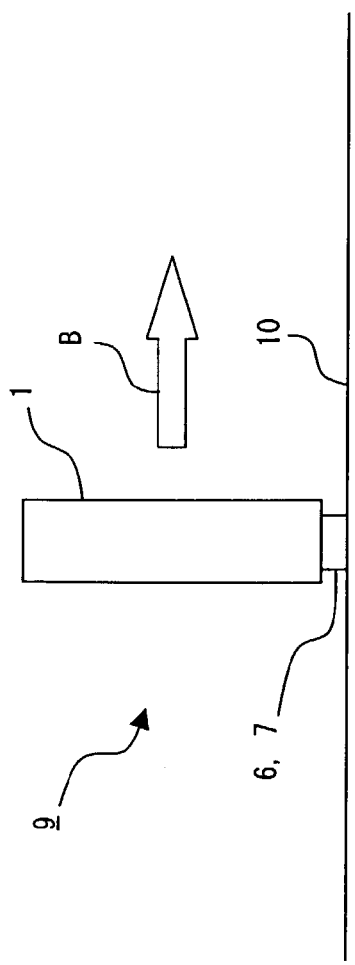
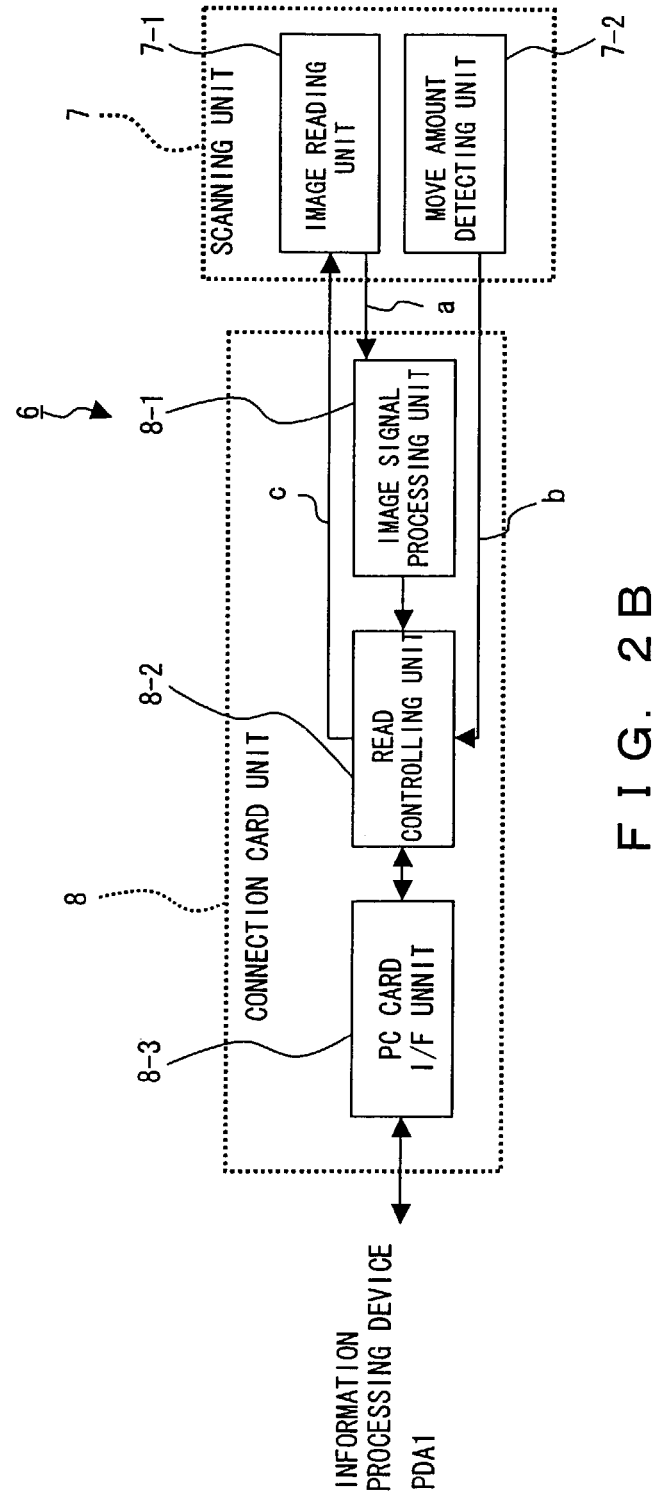
FIG. 2A
FIG. 2B

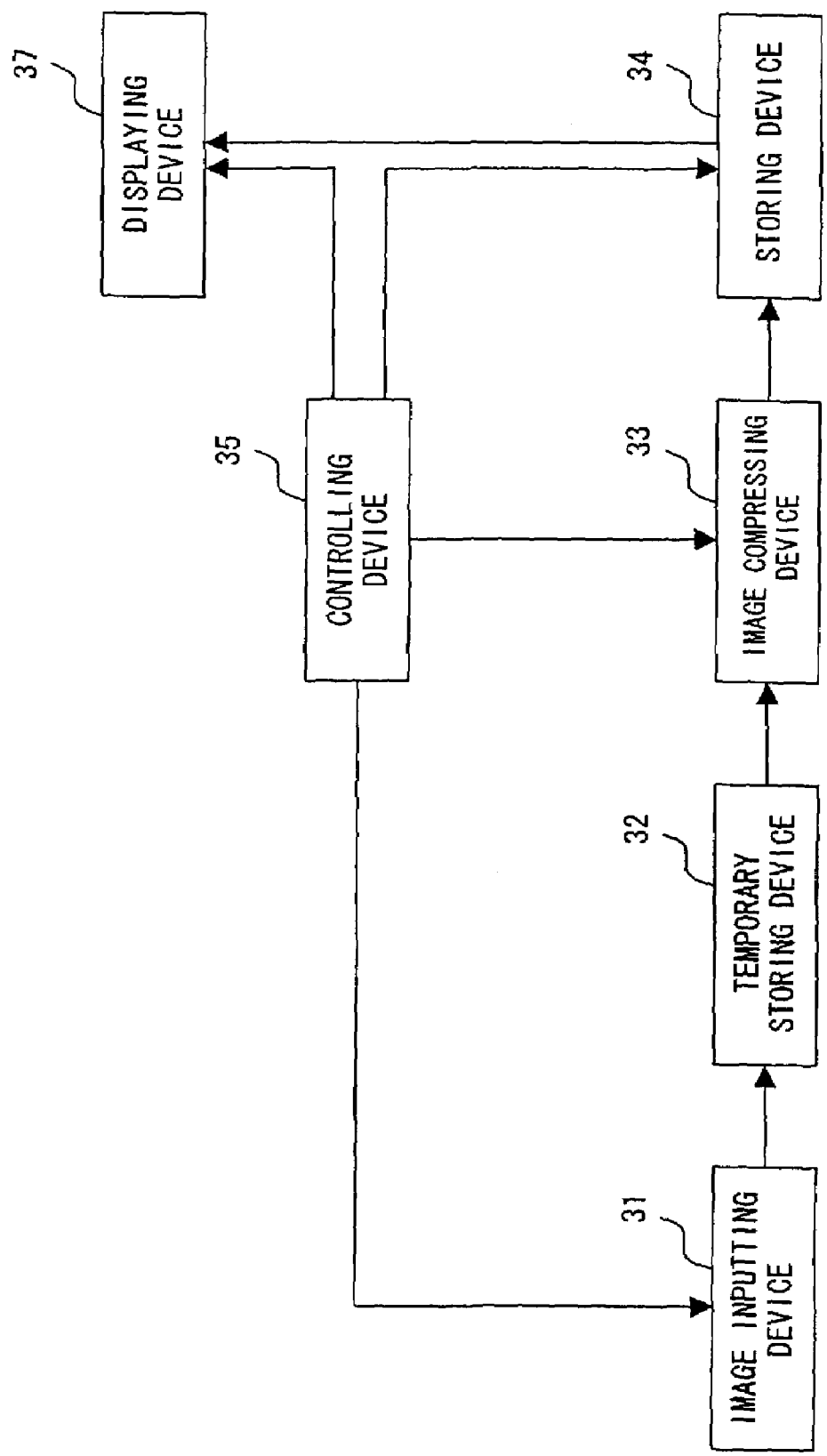
F I G. 8

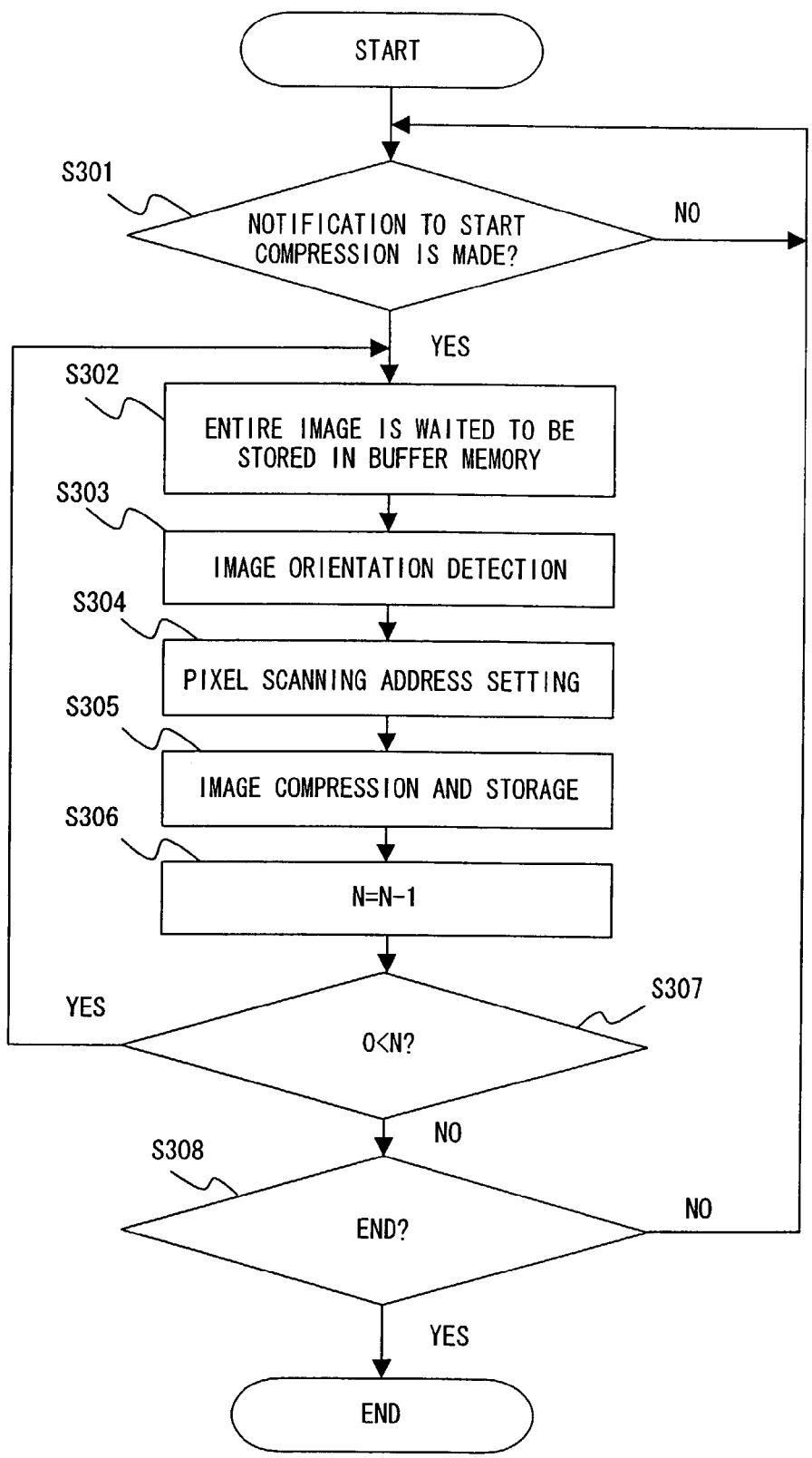
F I G. 13

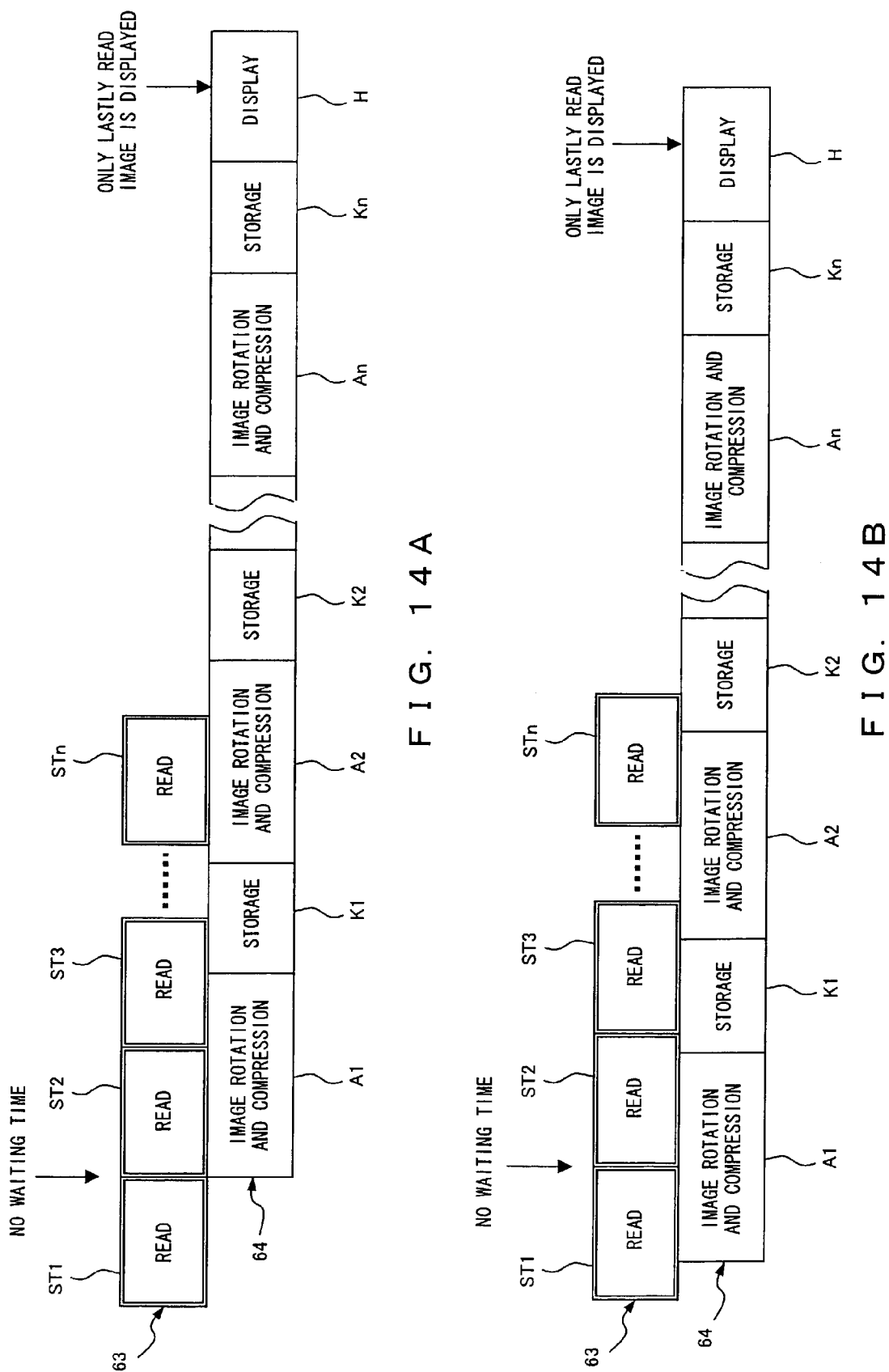

IMAGE INPUTTING APPARATUS, METHOD, AND STORAGE MEDIUM RECORDING IMAGE INPUTTING PROGRAM

BACKGROUND OF THE INVENTION

1. Field of the Invention

The present invention relates to an image inputting apparatus compressing the data of an image shot by a device having a camera capability, or the data of an image read by a portable scanner, and storing the compressed image in a memory.

2. Description of the Related Art

Conventionally, an image inputting apparatus, which is configured by a cellular phone comprising a camera capability composed of a lens, and an image capturing element such as a CCD (Charge Coupled Device), etc., compresses the data of a shot image, and stores the compressed image in a memory so as to reduce the storage space of the memory storing shot image data. Such an image capturing element is normally configured to capture a horizontally oriented image, and its original usage is to be embedded into a main body by being horizontally placed.

Generally, however, most cellular phones have a vertically oriented body for ease of portability, and also have a vertically oriented display unit so as to secure a large display region that suits the vertically oriented body. Accordingly, an image capturing element is embedded into a cellular phone by being rotated 90 degrees with reference to the body of the cellular phone, namely, by being vertically placed, so that the vertical and the horizontal directions of an image shot with a camera capability suit the vertically oriented display unit.

However, when a CCD reads an image shot with a camera capability by pixel, the image is read in a horizontal direction even in this case. Accordingly, the read image data is output to an internal image processing unit by being rotated 90 degrees with reference to the body of the cellular phone. Therefore, a correction to make the image data erect by rotating the image data 90 degrees in a reverse direction is made by the image processing unit within the cellular phone so as to make the orientation of the shot image and that displayed on a display unit match, before the image is compressed as described above.

Furthermore, with an image inputting apparatus configured by a portable information appliance such as a PDA (Personal Digital Assistant) comprising a hand-operated image scanner, a read operation can be performed in an arbitrary direction because of its small apparatus size. The read operation can be possibly performed for a manuscript to be read in a total of 8 directions resultant from combinations of up and down, and side to side directions (4 directions), and a way of holding the apparatus (2 ways).

FIGS. 1A, 1B, and 1C show such a hand-operated image scanner and a PDA. FIG. 1A shows a PDA 1. In this figure, a display unit 2 is arranged on almost the entire front of the PDA 1. The display unit 2 comprises a touch panel that is arranged by being overlaid on an LCD (Liquid Crystal Display). With an input pen 3 that accompanies the PDA 1 and is configured by a resinous thin stick, etc., various types of inputs can be made through the display unit 2. Additionally, a plurality of input buttons 4 are arranged below the display unit 2. Various types of instructions can be input also with the input buttons 4.

Normally, such a PDA 1 comprises a card insertion slot 5 at its top. For example, a PC card, a CF card, etc. is inserted into the card insertion slot 5, and used.

FIG. 1B shows a card-type image scanner 6, which is used by being inserted into the card insertion slot 5 of the above described PDA 1, and is an ultra-small image reading device. This card-type image scanner 6 is configured by a scanning unit 7 which reads an image, and a connection card unit 8. By inserting the connection card unit 8 into the card insertion slot 5 of the PDA 1 as indicated by an arrow A in FIG. 1B, a small image inputting apparatus 9 into which the PDA 1 and the card-type image scanner 6 are integrated is obtained as shown in FIG. 1C.

FIG. 2A is a side view showing the state where an image is read by the above described image inputting apparatus 9, whereas FIG. 2B is a block diagram showing the configuration of the card-type image scanner 6, which is one of the constituent elements of the image inputting apparatus 9.

Firstly, the PDA 1 is held by hand, the scanning unit 7 of the card-type image scanner (hereinafter referred to simply as a scanner) 6 is oriented downward to contact the upper surface of a medium to be read 10 such as paper, etc. as shown in FIG. 2A, and the scanning unit 7 is made to read an image on the medium to be read 10 by sliding the PDA 1 in a reading/scanning direction indicated by an arrow B.

As shown in FIG. 2B, the scanning unit 7 of the scanner 6 comprises: an image reading unit 7-1 optically reading the image on the medium to be read 10, and converting the read optical image data into an analog electric signal; and a move amount measuring unit 7-2 measuring the move amount of the image reading unit 7-1 on the medium to be read 10.

Additionally, the connection card unit 8 of the scanner 6 comprises: an image signal processing unit 8-1 processing an analog image signal a output from the above described image reading unit 7-1; a read controlling unit 8-2 controlling the driving of the image reading unit 7-1 by outputting a driving signal c to the image reading unit 7-1 based on a move amount signal b input from the move amount measuring unit 7-2; and a PC card I/F (interface) unit 8-3 inputting/outputting read data and an instruction signal to/from the PDA 1, which is an external information processing device. Read data (image signal) resultant from the scanning shown in FIG. 2A is output from the PC card I/F unit 8-3 of the connection card unit 8 to the PDA 1.

FIGS. 3A and 3B show an image inputting apparatus configured by a hand-operated bar image scanner and a personal computer. An image scanner 11 shown in FIG. 3A is configured by a line sensor 12 which is arranged to occupy nearly two-thirds of the longitudinal direction on the lower surface, and a grip unit 13 composed of a portion where the line sensor 12 is not arranged. An LED 14 is arranged at the upper end of the portion where the line sensor 12 is arranged. A connection cord 15 is externally drawn from the grip unit 13, and a dedicated PC card 16 is connected to the end of the connection cord 15 as shown in FIG. 3B.

The PC card 16 is inserted into a PC card slot 18 of a personal computer 17 as shown in FIG. 3B, whereby an image inputting apparatus into which the image scanner 11 and the personal computer 17 are integrated is built.

Also in this case, to read an image on the medium to be read 10, the grip unit 13 of the image scanner 11 is held, and the face of the line sensor 12 is made to contact the medium to be read 10, and slid on the medium to be read 10. The image scanner 11 comprises a processing unit having a capability similar to that of the scanning unit 7 in FIG. 2B, and also the PC card 16 comprises a processing unit having a capability similar to that of the connection card unit 8 in FIG. 2B. Accordingly, image data read by the image scanner 11 is captured by the image processing unit of the personal computer 17.

FIGS. 4A to 4H specifically show that there are a total of 8 scanning directions where an image on the medium to be read 10 is read by the above described card-type image scanner 6, the bar image scanner 11, etc. Note that the orientation of the medium to be read 10 is the same in all of these figures. Here, an explanation is provided by taking the bar image scanner 11 as an example.

Firstly, FIGS. 4A to 4D show the cases where the grip unit 13 of the image scanner 11 is held by the right hand to read a manuscript (the medium to be read 10. The same is applied to FIGS. 4B to 4H). FIG. 4A shows the case where the image scanner 11 is slid from the top to the bottom of the manuscript. As shown in this figure, the line sensor 12 first reads the uppermost part of the image of the manuscript from the left (the left side when viewed in this figure. The same is applied to FIGS. 4B to 4H) to the right as indicated by an arrow ml, and the image scanner 11 is then slid toward the bottom as indicated by an arrow S1. In this way, this read operation is repeated toward the bottom while reading the image from the left to the right in a similar manner as indicated by arrows m2 and m3. At this time, the image data output from the image scanner 11 to the personal computer 17 is erect image data.

Next, when the image scanner 11 is slid from the bottom to the top of the manuscript as shown in FIG. 4B, the line sensor 12 reads the lowermost part of the image of the manuscript from the left to the right, and the image scanner 11 is then slid toward the top. In this way, this read operation is repeated toward the top while reading the image from the left to the right in a similar manner. At this time, the image data output from the image scanner 11 to the personal computer 17 is image data obtained by rotating the erect image 180 degrees, and by mirror-reversing the erect image.

Additionally, when the image scanner 11 is slid from the left to the right of the manuscript as shown in FIG. 4C, the line sensor 12 reads the leftmost part of the image of the manuscript from the top to the bottom, and the image scanner 11 is then slid to the right. In this way, this read operation is repeated toward the right while reading the image from the top to the bottom in a similar manner. At this time, the image data output from the image scanner 11 to the personal computer 17 is image data obtained by rotating the erect image 90 degrees to the left, and by mirror-reversing the erect image.

Furthermore, when the image scanner 11 is slid from the right to the left of the manuscript as shown in FIG. 4D, the line sensor 12 reads the rightmost part of the image of the manuscript from the top to the bottom, and the image scanner 11 is then slid to the left. In this way, this read operation is repeated toward the left while reading the image from the top to the bottom in a similar manner. At this time, the image data output from the image scanner 11 to the personal computer 17 is image data obtained by rotating the erect image 90 degrees to the left.

FIGS. 4E to 4H show the cases where the grip unit 13 of the image scanner 11 is held by the left hand to read the manuscript. FIG. 4E shows the case where the image scanner 11 is slid from the top to the bottom of the manuscript. In this case, as shown in FIG. 4E, the line sensor 12 first reads the uppermost part of the image of the manuscript from the right to the left as indicated by an arrow n1, and the image scanner 11 is then slid toward the bottom as indicated by an arrow S2. In this way, this read operation is repeated toward the bottom while reading the image from the right to the left in a similar manner as indicated by arrows n2 and n3. At this time, the image data output from the image scanner 11 to the personal computer 17 is image data obtained by mirror-reversing the erect image.

Additionally, when the image scanner 11 is slid from the bottom to the top of the manuscript as shown in FIG. 4F, the image data output from the image scanner 11 to the personal computer 17 is image data obtained by rotating the erect image 180 degrees.

Furthermore, when the image scanner 11 is slid from the left to the right of the manuscript as shown in FIG. 4G, the image data output from the image scanner 11 to the personal computer 17 is image data obtained by rotating the erect image 90 degrees to the right.

Still further, when the image scanner 11 is slid from the right to the left of the manuscript as shown in FIG. 4H, the image data output from the image scanner 11 to the personal computer 17 is image data obtained by rotating the erect image 90 degrees to the right, and by mirror-reversing the erect image.

As described above, as an image read by the hand-operated scanner, an image that is rotated, mirror-reversed, or rotated and mirror-reversed is input except for the case where the read image is input as a positionally correct erect image. Accordingly, with the PDA 1 or the personal computer 17, a process for inversely rotating and/or mirror-reversing the image data input by being rotated and/or mirror-reversed as described above is performed by the internal image processing unit so as to correct the image data to a erect image according to a user instruction, before the data is compressed.

Additionally, the next read operation is enabled after a read rotated and/or mirror-reversed image is corrected, compressed, and stored in a memory each time a read operation is performed (for one page).

Furthermore, also with a portable information terminal such as a cellular phone, a PDA, etc., shot image data is rotated in most cases in a similar manner as described above. For some portable information terminals, their CCD portion can be detached, and image shooting can be performed by orientating the CCD in an arbitrary orientation by reconnecting to the main body with a cord. Accordingly, also for a cellular phone or a portable information terminal, etc. having a shooting capability, a rotation correction prior to the compression of captured image data is a necessary process.

Note that if an image is a shot image, it is not mirror-reversed, but only rotated. As a method compressing image data, a JPEG method is used in many cases if an image is a color or a grayscale image. If an image is a binary image, various methods such as MH, MR, JBIG, etc. are used.

In the meantime, the data processing performances of the above described portable information terminal such as a cellular phone, a PDA, etc. are generally lower than a normal information processing device like a personal computer.

FIG. 5 schematically shows the flow of processes performed in the case where image data is processed by such a data processing device having low data processing performance. As shown in FIG. 5, the flow of the processes is composed of a "read" process 21 for reading a manuscript, a "rotation" process 22 for making a rotation correction for a rotated and/or mirror-reversed image, an "image compression" process 23 for compressing the image data corrected to be a erect image, a "storage" process 24 for storing the compressed image data in a memory, and a "display" process 25 for displaying the read image on a monitor screen after these processes are terminated.

The above described processes 22 to 25 become a waiting time until the next read operation. As described above, the next read operation cannot be started until a read image is corrected by being rotated, compressed, and stored in a memory. Therefore, the read operation cannot be immediately started due to an occurrence of the waiting time, and a user is made to wait, leading to a problem that the operability becomes poor.

Furthermore, the waiting time becomes longer because the processing time increases by the amount of time which corresponds to the rotation correction process of an image in addition to its compression time. Therefore, a user must wait for a longer time, leading to a poorer operability.

SUMMARY OF THE INVENTION

An object of the present invention is to provide an easy-to-use image inputting apparatus, method, and storage medium recording on image inputting program with which a waiting time is shortened, and a read operation can be successively performed for a manuscript, in view of the above described conventional background.

According to the present invention, a rotation or mirror-reversing process for correcting image data that is input by being rotated or mirror-reversed to a erect image is performed simultaneously with a compression process of the image data, whereby the processing time can be reduced in comparison with the case where the rotation or mirror-reversing process is individually performed. As a result, a problem that the operability becomes poor due to long waiting time can be solved.

Additionally, the compression process including the image rotation or mirror-reversing process, and the storage process of compressed image are performed in parallel with an image input. Therefore, an image input can be successively made with no waiting time, whereby a preferable image inputting apparatus having good operability demanded by a user can be provided.

Furthermore, an image input time of a cellular phone having a shooting capability, in which an image capturing element is arranged in an orientation different from a display orientation, and an image reading time of a portable information appliance which an image scanner is fixed to or attached/detached to/from freely can be shortened, which greatly contributes to improvements in the operability of these appliances.

BRIEF DESCRIPTION OF THE DRAWINGS

FIG. 2A is a side view showing the state where an image is read by the conventional image reading processing device;

FIG. 2B is a block diagram showing the configuration of a card-type image scanner, which is one of constituent elements of the image reading processing device;

FIG. 8 shows a third principle of the present invention;

FIG. 13 is a flowchart showing the operations of a process performed by the image compressing unit of the image inputting apparatus in the case where the presence/absence of a rotation, and the presence/absence of mirror-reversing of an image are automatically detected; and FIGS. 14A and 14B schematically show the operating state of the image inputting apparatus according to the present invention for ease of understanding of an operation and an effect achieved by the image inputting apparatus.

DESCRIPTION OF THE PREFERRED EMBODIMENTS

Figure 6:
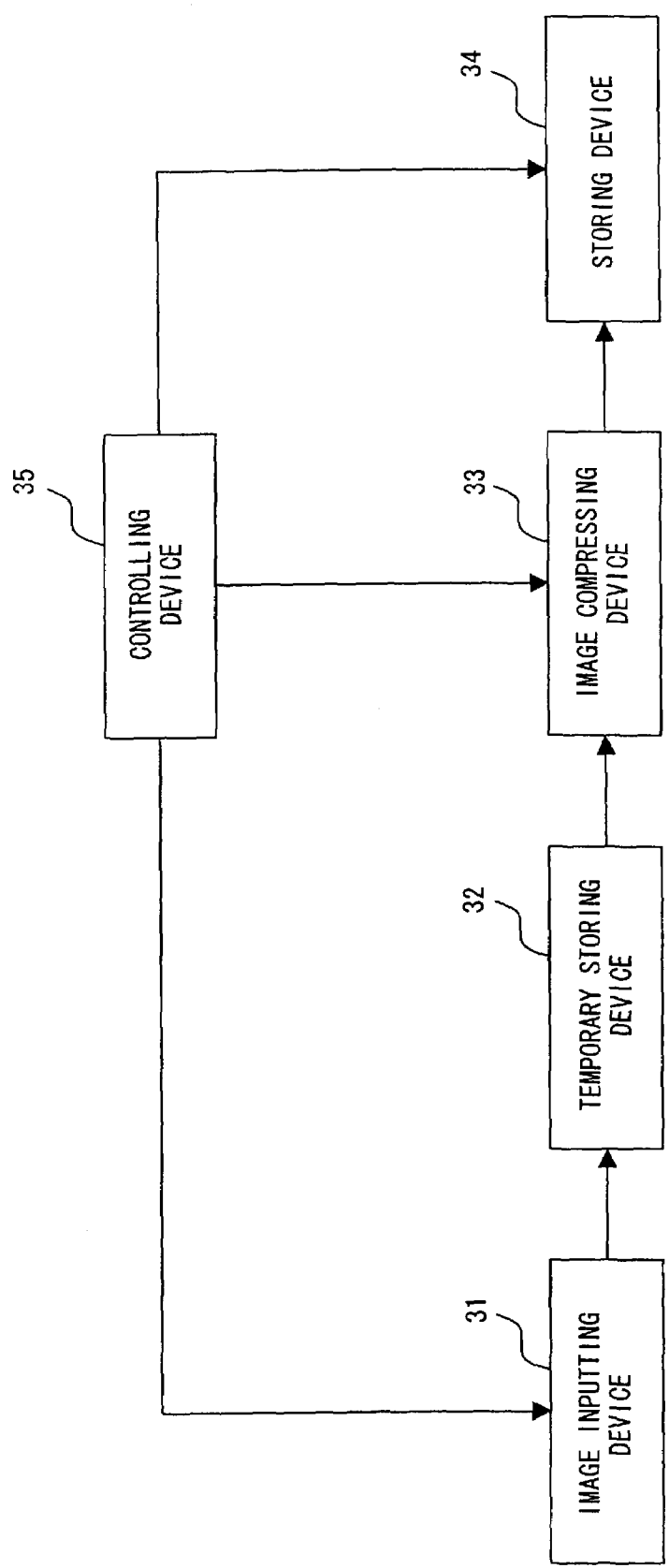
FIG. 6 shows a first principle of the present invention.

FIG. 6 is a block diagram showing the fundamental configuration of a first preferred embodiment according to the present invention.

An image inputting apparatus according to the first preferred embodiment at least comprises: an image inputting device 31 inputting image data; a temporary storing device 32 temporarily storing the image data input by the image inputting device 31; and an image compressing device 33 reading the image data stored in the temporary storing device 32, and compressing the image data. The image compressing device 33 is configured to read the image data stored in the temporary storing device 32 by scanning the image data in a predetermined pixel order, and to compress the read data.

As described above, a compression process is performed by changing an order of extracting pixels so as to make image data erect viewed from predetermined direction when the image data is compressed, whereby a rotation and/or mirror-reversing process can be performed simultaneously with the compression process.

Figure 4A:
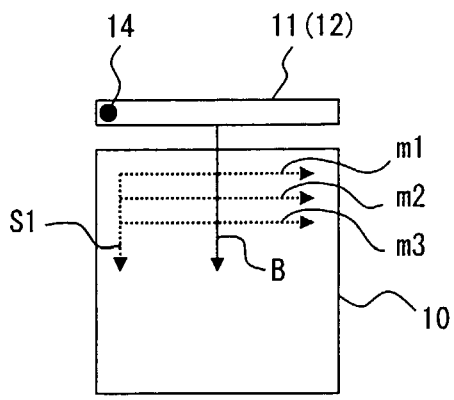
FIGS. 4A to 4H specifically show a total of 8 scanning directions where an image on a medium to be read is read by an image scanner.
Figure 4E:
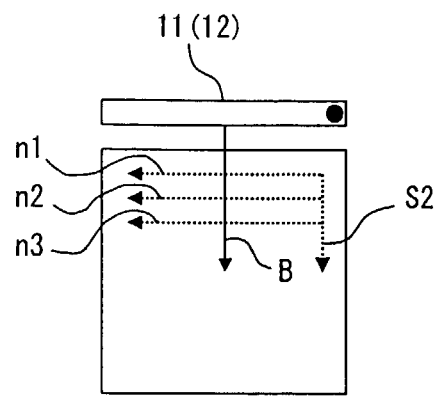
Figure 4B:
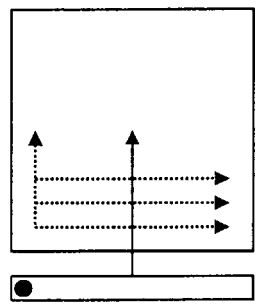
Figure 4F:
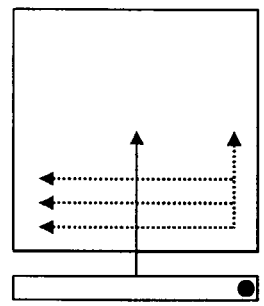
Figure 4C:
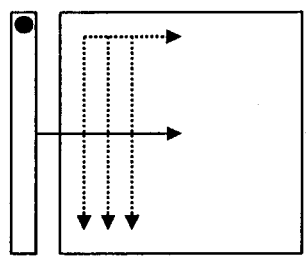
Figure 4G:
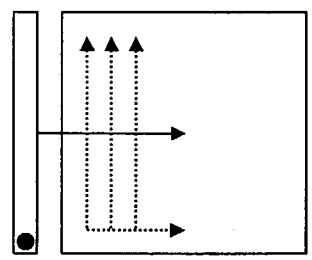
Figure 4D:
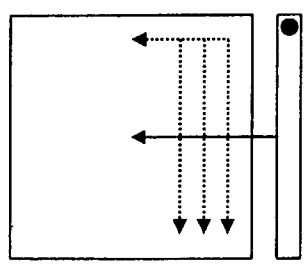

For example, all of the image data other than that of the erect image shown in FIG. 4A are rotated and/or mirror-reversed (however, in the case of shot image data, the data other than the input image data of the erect image shown in FIG. 4A is obtained only by rotating the erect image as shown in FIGS. 4D, 4F, or 4G). These rotated and/or mirror-reversed image data can be corrected to a erect image simultaneously with their compression.

The image inputting apparatus according to the first preferred embodiment further comprises: a storing device 34 storing image data; and a controlling device 35 controlling the above described image inputting device 31, the above described image compressing device 33, and the above described storing device 34. The controlling device 35 is configured to control the compression of image data, which is performed by the image compressing device 33, and the storage of compressed image data, which is performed by the storing device 34, in parallel with the input of image data, which is made by the image inputting device 31.

The compression process of image data by the image compressing device 33, and the storage of compressed image data by the storing device 34 are performed in parallel with the input of image data from the image inputting device 31 as described above, whereby an input of the next image data can be started without waiting for the completion of the storage of the input image data.

Furthermore, the controlling device 35 of the image inputting apparatus according to the first preferred embodiment is configured to control the input process of image data, which is performed by the image inputting device 31, with higher priority than the compression process of image data, which is performed by the image compressing device 33, and the storage process of compressed image data, which is performed by the storing device 34.

As described above, the input process of image data is performed with higher priority than the compression of image data, and the storage of compressed image data, so that a read of the next image can be started without waiting for the completion of the storage of image data.

Figure 7:
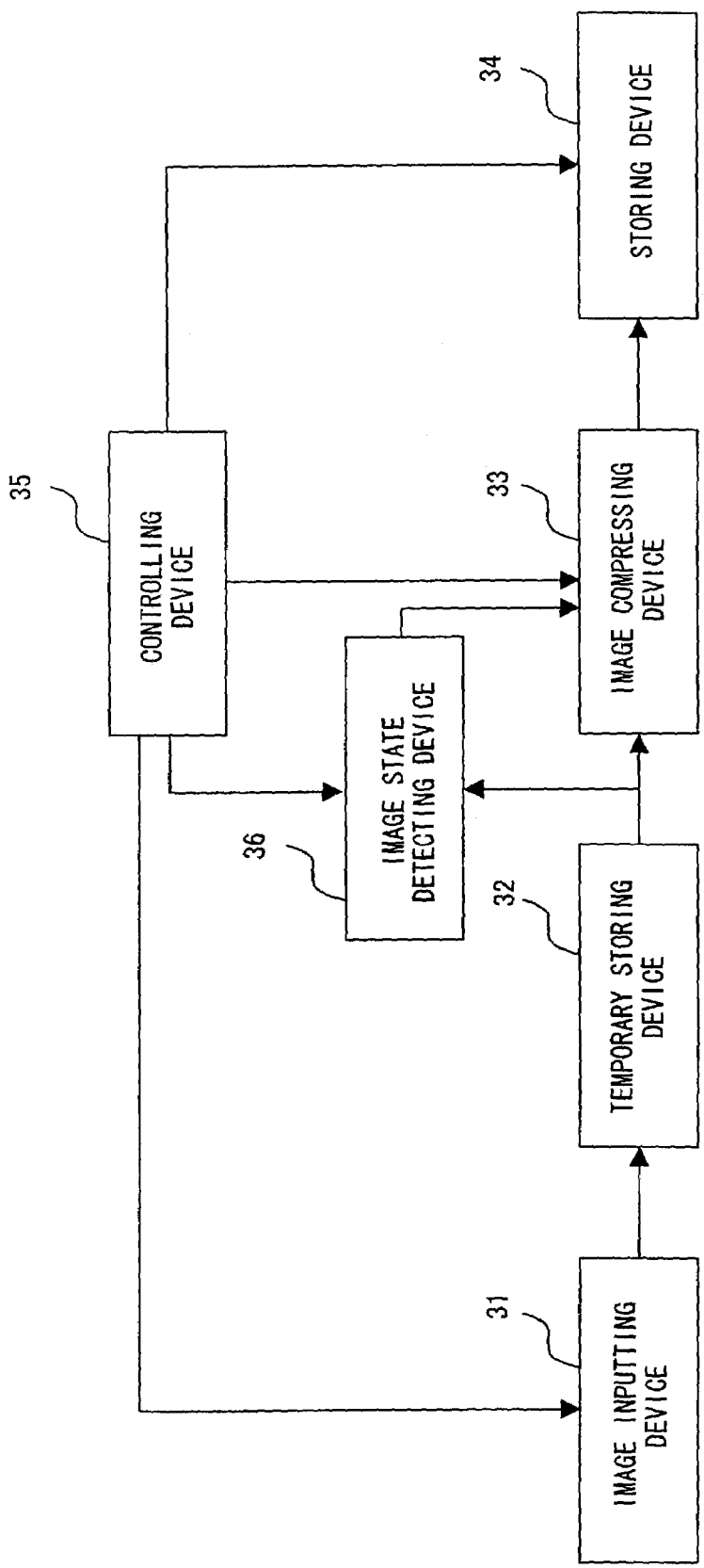
FIG. 7 shows a second principle of the present invention.

FIG. 7 is a block diagram showing the fundamental configuration of a second preferred embodiment according to the present invention.

An image inputting apparatus according to the second preferred embodiment, for example, further comprises an image state detecting device 36 detecting a rotation direction, and the presence/absence of mirror-reversing of image data, in addition to the fundamental configuration of the above described first preferred embodiment. The image state detecting device is configured to detect the rotation direction and the presence/absence of mirror-reversing of an image from the image data input by the image inputting device. The image compressing device is configured to scan the image data in a pixel order which cancels the rotation direction and the mirror-reversing of the image data, which are detected by the image state detecting device, and to compress the image data.

As described above, the orientation of temporarily stored image data is detected before the image data is compressed, pixels are read in a scanning order which makes the image data erect based on a detection result, and the read data is compressed, whereby the image data can be automatically compressed while being corrected to a erect image without a user instruction.

Note that the automatic detection of the orientation of an image can be implemented with Japanese Patent Publication No. 11-316798, which is a known technique.

FIG. 8 is a block diagram showing the fundamental configuration of a third preferred embodiment according to the present invention.

An image inputting apparatus according to the third preferred embodiment further comprises a displaying device 37 displaying an image based on the image data, in addition to the fundamental configuration of the first preferred embodiment. The controlling device 35 is configured to perform a control for making the displaying device 37 display only an image based on image data, for which an input process is lastly performed, after a series of input processes of image data is terminated by the image inputting device 31.

As described above, when input image data is displayed as an image, an image based on lastly input image data is displayed only in the case where the image read process is completed, and an image to be compressed is not temporarily stored. Besides, a display process is not performed while an image is being read. Therefore, a processing load can be reduced in comparison with the case where each page is displayed while an image is being read.

An image inputting method according to the present invention is described next.

The image inputting method according to the present invention comprises: inputting image data; temporarily storing the input image data; reading the temporarily stored image data, and compressing the image data, wherein at the time of image data compression, the image data is read by scanning the temporarily stored image data in a predetermined pixel order, and the read data is compressed.

This image inputting method further comprises: storing image data; and controlling an input of the image data, compression of the image data, and storage of the image data, wherein at the time of a control, a control that the image data is compressed, and the compressed image data is stored in parallel with the input of the image data is performed.

Additionally, the image inputting method further comprises detecting a rotation direction and presence/absence of mirror-reversing of image data, wherein at the time of detection, the rotation direction and the presence/absence of mirror-reversing of an image are detected from input image data, and at the time of image data compression, the image data is scanned in a pixel order which cancels the detected rotation direction and mirror-reversing of the image data, and the image data is compressed.

Furthermore, the image inputting method further comprises displaying an image based on the image data, wherein at the time of the control, a control that only an image based on image data, for which an input process is lastly performed, is displayed after a series of input processes of the image data is terminated is performed.

Still further, with this image inputting method, at the time of the control, a control that the input of the image data is performed with higher priority than the compression of the image data, and the storage of the compressed image data is performed.

A storage medium on which is recorded an image inputting program according to the present invention is descried next.

A storage medium on which is recorded an image inputting program for causing a CPU of a scanner device or an image capturing device, or a CPU of an information processing device fixed to or attached/detached freely to/from the scanner device or the image capturing device to execute a process, the process comprising: inputting image data; temporarily storing the input image data; reading the temporarily stored image data, and compressing the image data, wherein at the time of image data compression, the image data is read by scanning the temporarily stored image data in a predetermined pixel order, and the read data is compressed.

The process of the image inputting program recorded on the storage medium further comprises: storing image data; and controlling an input of the image data, compression of the image data, and storage of the image data, wherein at the time of a control, a control that the image data is compressed, and the compressed image data is stored in parallel with the input of the image data is performed.

The process of the image inputting program recorded on the storage medium further comprises detecting a rotation direction and presence/absence of mirror-reversing of image data, wherein at the time of detection, the rotation direction and the presence/absence of mirror-reversing of an image are detected from input image data, and at the time of image data compression, the image data is scanned in a pixel order which cancels the detected rotation direction and mirror-reversing of the image data, and the image data is compressed.

The process of the image inputting program recorded on the storage medium further comprises displaying an image based on the image data, wherein at the time of a control, a control that only an image based on image data, for which an input process is lastly performed, is displayed after a series of input processes of the image data is terminated is performed.

With the process of the image inputting program recorded on the storage medium, at the time of the control, a control that the input of the image data is performed with higher priority than the compression of the image data, and the storage of the compressed image data is performed.

Hereinafter, a preferred embodiment according to the present invention is further described in detail with reference to the drawings.

Figure 9:
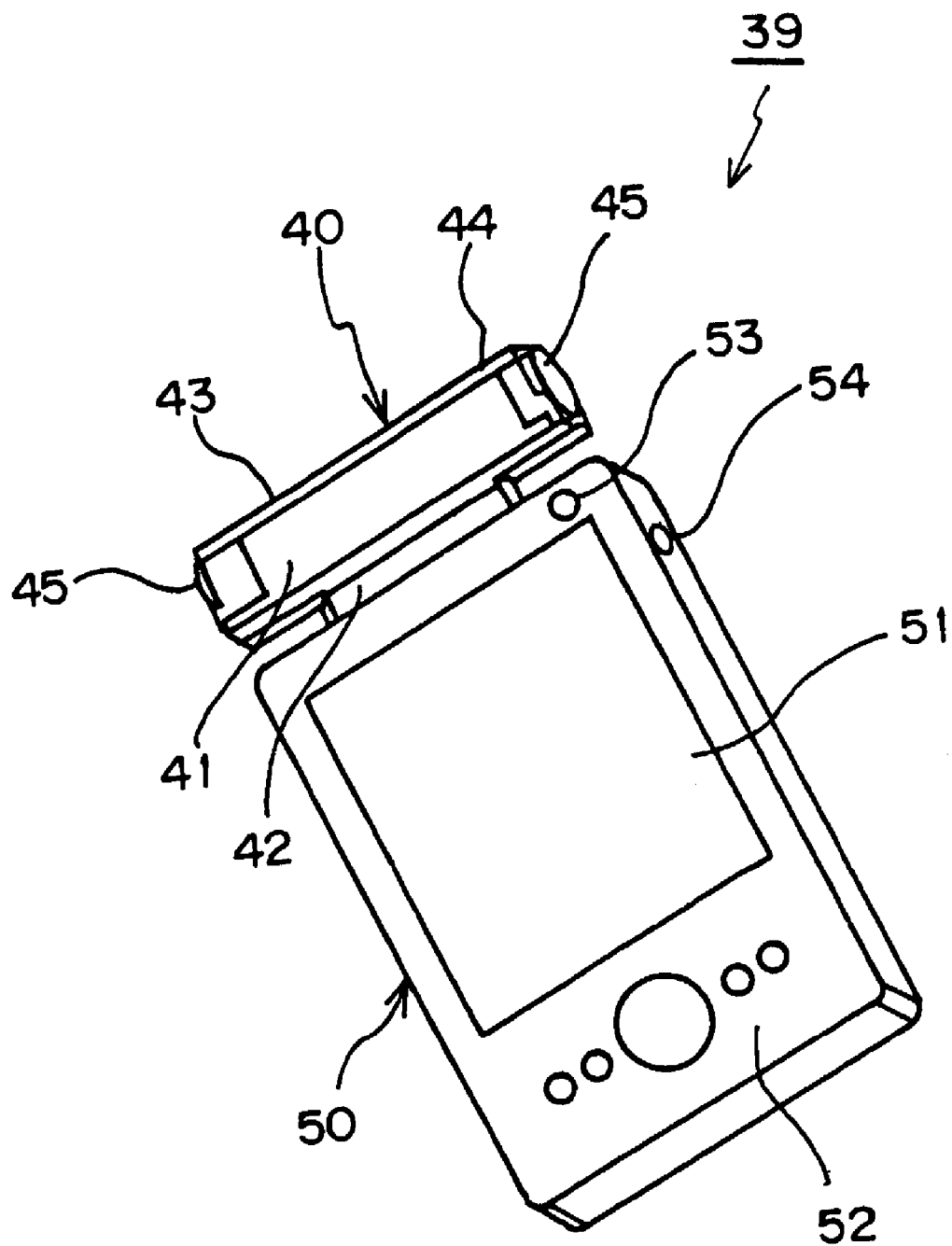
FIG. 9 exemplifies the configuration of an image inputting apparatus as one preferred embodiment.

FIG. 9 exemplifies the configuration of an image inputting apparatus as one preferred embodiment. This image inputting apparatus 39 is formed by integrating a card-type image scanner 40 of a small size, and a PDA 50.

The card-type image scanner 40 is composed of a scanner unit 41, and a connection card unit 42. On an image scanning face that is hidden and not shown in the schematic of the scanner unit 41, an image sensor 43 that occupies almost the whole of the longitudinal direction, and a manuscript detection sensor 44 that is close to the edge of the image sensor 43 are arranged. The scanner unit 41 comprises rollers 45 respectively at both of the end faces of the longitudinal direction, and the rollers 45 are provided with cooperative encoders not shown in this figure.

The connection card unit 42 is inserted into a card slot that is open at the top of the PDA 50, so that the card-type image scanner 40 and the PDA 50 are integrated to form the image inputting apparatus 39.

The PDA 50 comprises an input display unit 51 that largely occupies the front face, input buttons 52 which are arranged below the input display unit 51 and used to input various types of instructions, and an LED (Light Emitting Diode) 53 arranged close to the upper right corner of the input display unit 51. Furthermore, a power-on button 54 is arranged in an upper portion of the right side. The above described input display unit 51 is configured by overlaying a touch panel on an LCD display device.

Figure 10:
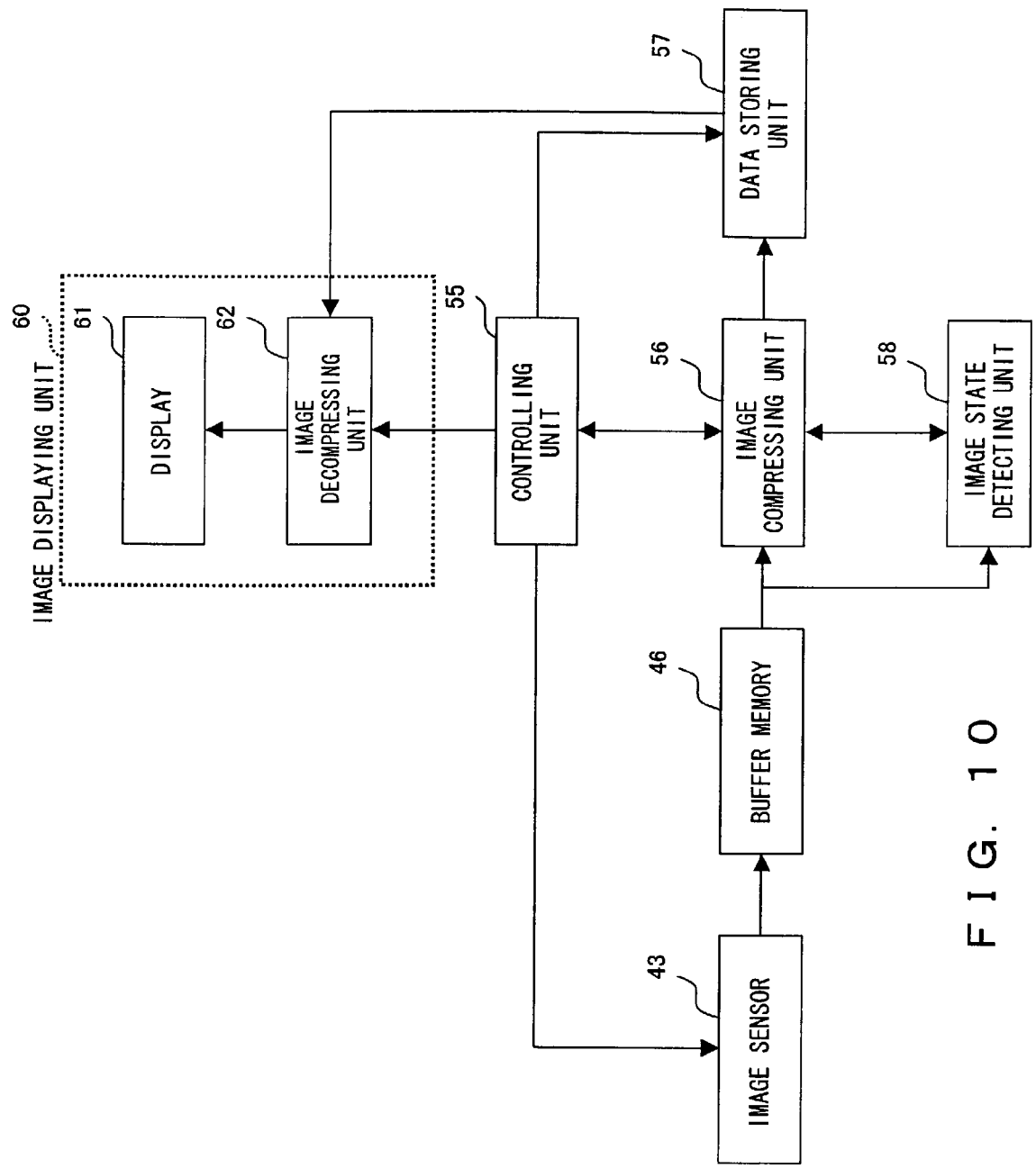
FIG. 10 is a block diagram showing the configuration of the image inputting apparatus as the one preferred embodiment.

FIG. 10 is a block diagram showing the configuration of the above described image inputting apparatus 39 configured by the card-type image scanner 40 and the PDA 50. As shown in this figure, the image inputting apparatus 39 is configured by an image sensor 43, a buffer memory 46, a controlling unit 55, an image compressing unit 56, a data storing unit 57, an image state detecting unit 58, and an image display unit 60. The image display unit 60 is configured by a display 61 and an image decompressing unit 62.

The display 61 is the LCD display device that is arranged beneath the touch panel of the input display unit 51 shown in FIG. 9. The buffer memory 46 is included within the card-type image scanner 40. The other constituent blocks are arranged within the PDA 50. However, the controlling unit 55 is a control block configured by a cooperation between a CPU arranged on the side of the card-type image scanner 40, and a CPU arranged on the side of the PDA 50. As a matter of course, only the CPU on the side of the PDA 50 may control all of the constituent blocks.

To the controlling unit 55, an instruction to start an image input is externally provided. In the configuration example shown in FIG. 9 according to this preferred embodiment, the instruction to start an image input is input by a user from the input buttons 52 or the touch panel of the input display unit 51.

Figure 1A:
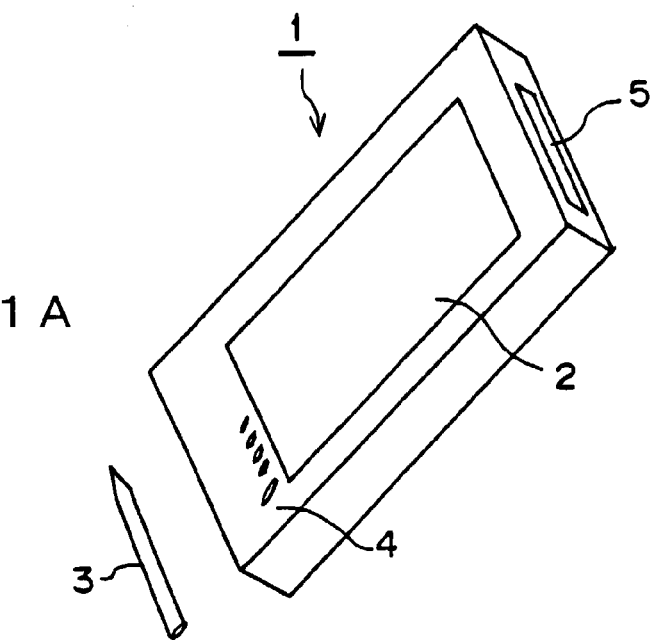
FIGS. 1A, 1B, and 1C explain a conventional image reading processing device configured by a hand-operated image scanner and a PDA.
Figure 1B:
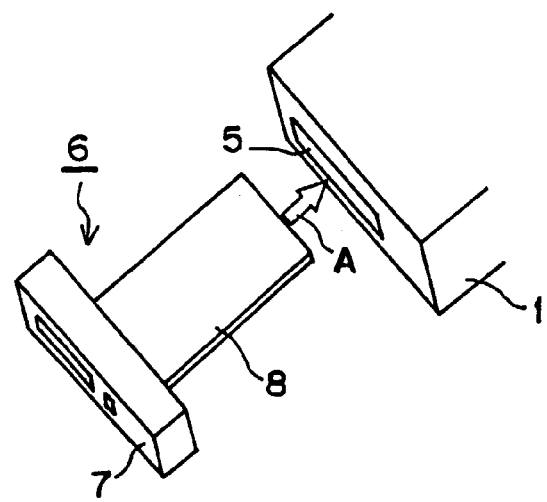
Figure 1C:
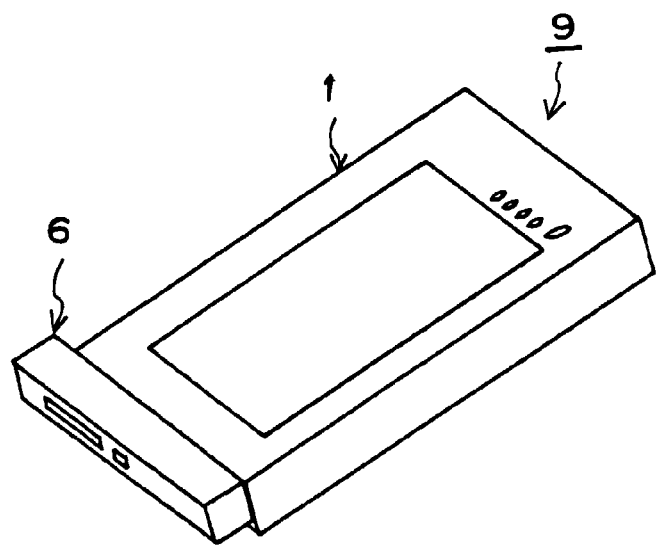
Figure 3A:
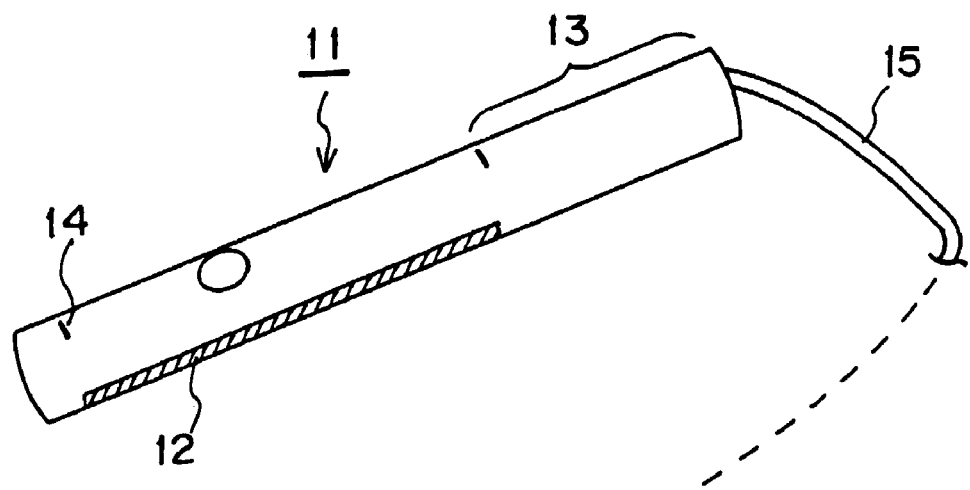
FIGS. 3A and 3B show a conventional image reading processing system configured by a hand-operated bar image scanner and a personal computer.
Figure 3B:
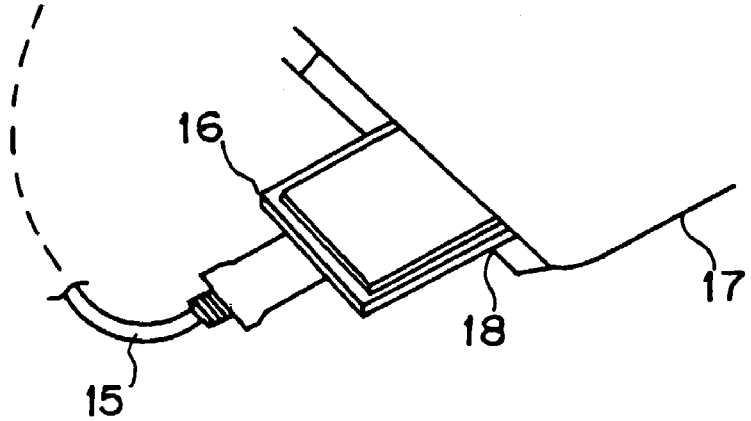

Additionally, if the constituent blocks according to this preferred embodiment are implemented by the image inputting apparatus configured by the hand-operated bar image scanner and the personal computer, which are shown in FIGS. 3A and 3B, the instruction to start an image input, which is provided to the controlling unit 55, is a press operation of an input button arranged on the grip unit of the bar image scanner. Furthermore, for an image inputting apparatus configured by an information processing device having a shooting capability, the instruction to start an image input is provided to the controlling unit 55 with a press operation of a shutter button of a camera unit, although this is not shown.

The controlling unit 55 increments a counter not shown by 1 each time a read start instruction is provided.

The image compressing unit 56 reads an image from the buffer memory 46, compresses the read image, and stores the compressed image data in the data storing unit 57, if the orientation of the image is not detected.

If a direction where an image is rotated is predetermined, the image stored in the buffer memory 46 is read in a pixel scanning order equivalent to the predetermined rotation direction, and the read image is compressed. For example, if the image is rotated 90 degrees to the right, the pixels are extracted and compressed in the scanning order shown in FIG. 4G.

In the meantime, if the orientation of an image is to be detected, the image compressing unit 56 issues an instruction to detect the state of the image to the image state detecting unit 58 after the entire image is stored in the buffer memory 46.

The image state detecting unit 58 detects to which direction among the directions shown in FIGS. 4A to 4H the state of the image stored in the buffer memory 46 corresponds, and notifies the image compressing unit 56 of the detected rotation direction and presence/absence of mirror-reversing.

If the image data stored in the buffer memory 46 is, for example, image data that is read as shown in FIG. 4G, and rotated 90 degrees to the right, the image compressing unit 56 sequentially reads the pixels from the buffer memory 46 in a scanning order of pixels to be read from the buffer memory 46 after switching the scanning order to that shown in FIG. 4G based on a notification from the image state detecting unit 58, and compresses the read data while reading the pixels. The compressed image data is then stored in the data storing unit 57.

The image compressing unit 56 decrements the counter by 1 after the storage of the compressed data in the data storing unit 57 is completed. While the value of the counter is equal to or larger than 1, it is determined that an image yet to be stored in the data storing unit 57 remains in the buffer memory 46. Therefore, the compression process for the image data within the buffer memory 46 is repeatedly performed until the value of the counter reaches 0.

The controlling unit 55 determines that the read operation (image input operation) is once terminated when the counter reaches 0, and issues an instruction to display an image based on lastly stored image data to the image decompressing unit 62.

The image decompressing unit 62 reads the compressed data that is instructed by the controlling unit 55 from the data storing unit 57, decompresses the image data, and makes an image appear on the display 61 based on the decompressed image data.

Operations of the process performed by the above described controlling unit 55 are described below by using a flowchart.

Figure 11:
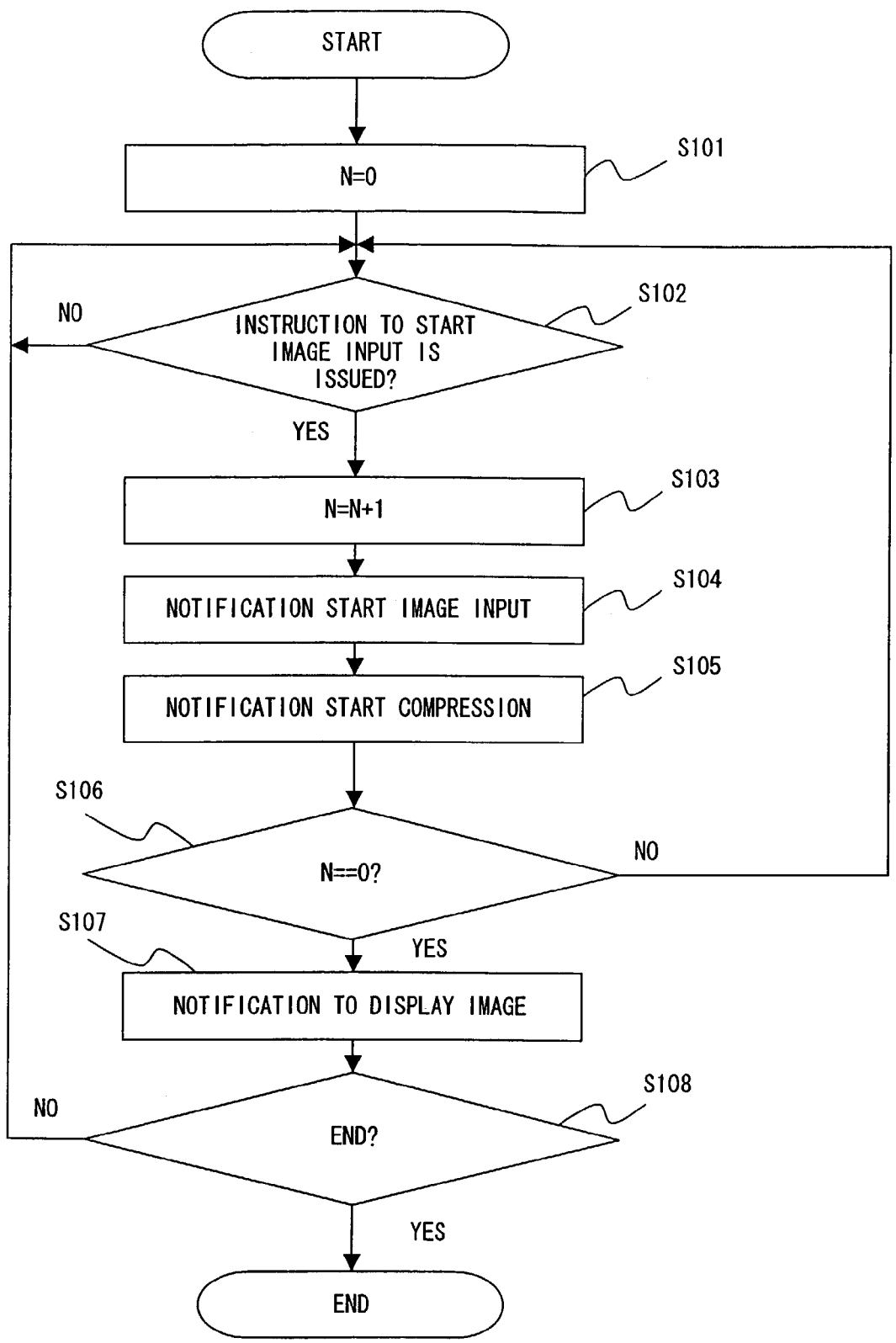
FIG. 11 is a flowchart showing the operations of a process performed by a controlling unit of the image inputting apparatus.

FIG. 11 is a flowchart showing the operations of the process performed by the controlling unit of the image inputting apparatus.

In this figure, firstly, in step S101, the value of the counter N is cleared to 0. Next, in step S102, the instruction to start an image input is waited to be externally issued ("No" in step S102). When this instruction is issued ("Yes" in step S102), the process goes to step S103.

In step S103, the value of the counter N is incremented by 1. Then, in step S104, an image input start is notified to the image sensor 43. Furthermore, in step S105, a compression start of the input image is notified to the image compressing unit 56. The value of the counter N is decremented by 1 after the image compression process is completed by the image compressing unit 56. Next, in step S106, it is determined whether or not the value of the counter N is 0.

If the value of the counter N is not 0 ("No" in step S106), the process goes back to step S102. Then, steps S102 to S106 are repeated, and an image input can be successively made in parallel with image compression.

If the value of the counter N is 0 ("Yes" in step S106), it is determined that the image input is once terminated in this case. The process therefore goes to step S107. In step S107, a notification to decompress the lastly input image is made to the image decompressing unit 62. The image decompressing unit 62 makes the decompressed image appear on the display 61.

Then, it is determined whether or not a notification to terminate the process is externally made in step S108. If the notification to terminate the process is made, the process is terminated. If the notification to terminate the process is not made, the process goes back to step S102.

Figure 12:
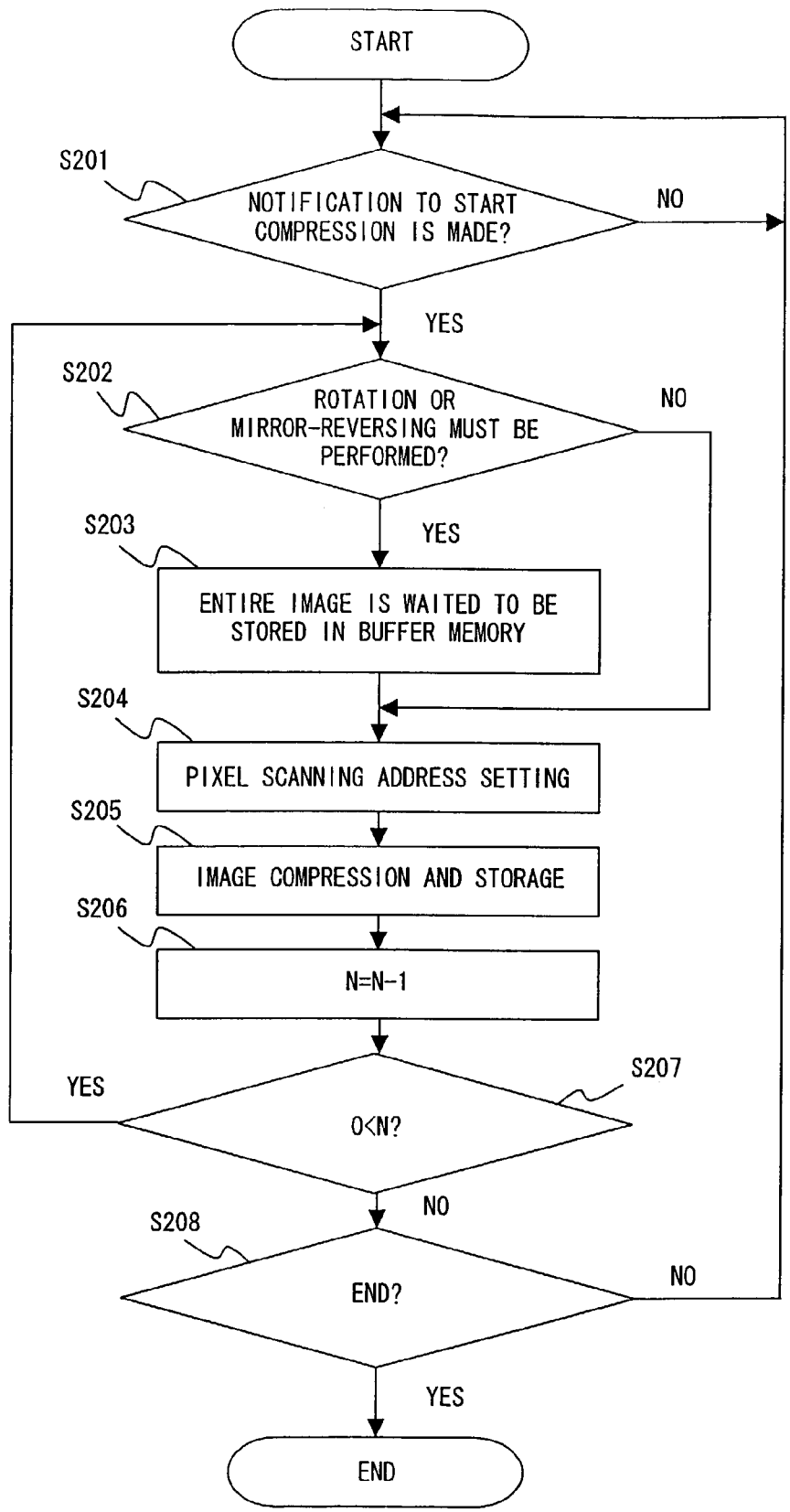
FIG. 12 is a flowchart showing the operations of a process performed by an image compressing unit of the image inputting apparatus in the case where the presence/absence of a rotation, and the presence/absence of mirror-reversing of an image are not automatically detected.

FIG. 12 is a flowchart showing the operations of a process performed by the image compressing unit 56 of the image inputting apparatus in the case where the presence/absence of a rotation, and the presence/absence of mirror-reversing of an image are not automatically detected. This process is performed in parallel with the above described process of the controlling unit 55.

Firstly, in step S201, a notification to start compression is waited to be made from the controlling unit 55. When the notification to start compression is made, the process goes to step S202. In step S202, it is determined whether or not to rotate or mirror-reverse the image.

If it is determined not to rotate or mirror-reverse the image ("No" in step S202), the process goes to step S204. Or, if it is determined to rotate or mirror-reverse the image ("Yes" in step S202), the process goes to step S203.

Figure 4H:
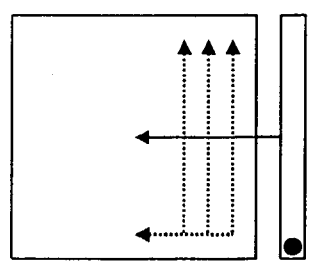

In step S203, the entire image data is waited to be stored in the buffer memory 46, since the entire image data must be input depending on a pixel scanning order, for example, as shown in FIG. 4C or 4H.

In step S204, a pixel scanning address which indicates a scanning order of pixels to be read from the buffer memory 46 is set in correspondence with the determined rotation or mirror-reversing direction.

In step S205, the image data within the buffer memory 46 is read by scanning the pixels according to the set pixel scanning address, and the read image data is compressed. Then, the compressed data is stored in the data storing unit 57.

In step S206, the value of the counter N is decremented by 1. Then, it is determined whether or not the value of the counter N is larger than 0. If the value of the counter N is larger than 0 ("Yes" in step S207), it is determined that image data yet to be compressed exists within the buffer memory 46, and the process goes back to step S202.

If the value of the counter N is not larger than 0, namely, if the value of the counter N is 0 ("No" in step S207), the process goes to step S208.

In step S208, it is determined whether or not a notification to terminate the process is externally input. If the notification to terminate the process is input ("Yes" in step S208), the process is terminated. If the notification to terminate the process is not input ("No" in step S208), the process goes back to step S201.

FIG. 13 is a flowchart showing the operations of a process performed by the image compressing unit 56 of the image inputting apparatus in the case where the presence/absence of a rotation, and the presence/absence of mirror-reversing of an image are automatically detected. Also this process is performed in parallel with the above described process of the controlling unit 55.

In FIG. 13, the operations of steps S301 and S302 are respectively identical to those of steps S201 and S203 in FIG. 12.

Next, in step S303 of FIG. 13, the presence/absence of a rotation, and the presence/absence of mirror-reversing of the image stored in the buffer memory 46 with reference to the erect orientation are detected. This detection is made by using the technique disclosed by the above described Japanese Patent Publication No. 11-316798.

Then, in step S304, a pixel scanning address for reading the rotated or mirror-reversed image data as erect image data is set based on a result of the above described detection made in step S303.

Subsequent operations of steps S305 to S308 are identical to those of steps S205 to S208 shown in FIG. 12.

FIGS. 14A and 14B schematically show the operating state of the image inputting apparatus. 39 that operates as described above for ease of understanding of an operation/effect achieved by the image inputting apparatus.

FIG. 14A shows the operating state in the case where entire image data is waited to be stored in the buffer memory 46 as shown in step S203 of FIG. 12 or step S302 of FIG. 13, if the input image data is rotated or mirror-reversed as shown in FIGS. 4B to 4D, or 4F to 4H.

As shown in FIG. 14A, the initial image input (read operation. The same is applied to the subsequent explanation) process ST1 is started. Upon termination of the image input process ST1, a rotation (a correction of rotation and mirror-reversing. The same is applied to the subsequent explanation) and compression process A1 for the input image data, and a storage process K1 for the compressed image data are performed. In parallel with these processes, a process ST2 for the next image input is performed in succession to the terminated initial image input process ST1.

Figure 5:
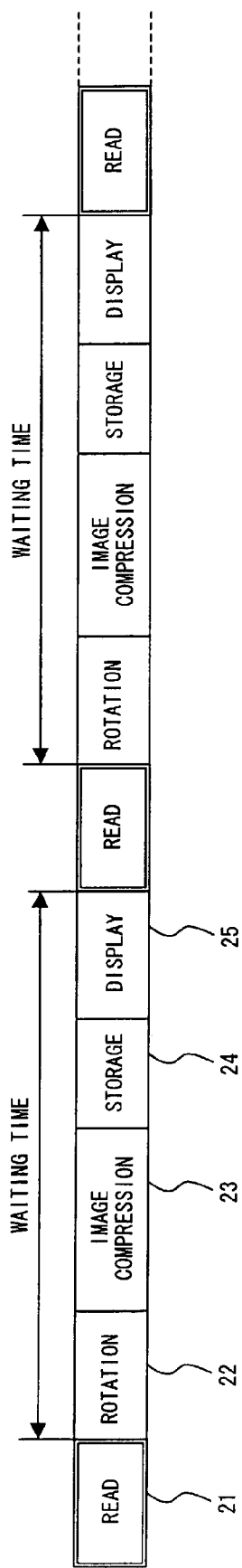
FIG. 5 schematically shows the flow of processes performed in the case where image data is processed by a conventional data processing device having low data processing performance.

Namely, a waiting time like that shown in FIG. 5 does not occur in the image input here. That is, processes ST1, ST2, . . . , STn are successively performed with no waiting time as a flow 63 of the image input processes shown in FIG. 14A.

Additionally, as a flow 64 of image input data processes, which is executed in parallel with the flow 63, a rotation and compression process A1 for image data, and a storage process K1 for the compressed image data, then a rotation and compression process A2 for the next image data, and a storage process K2 for the compressed image data, ... are successively performed, and an intermediate display process is not performed.

After a rotation and compression process An for image data input by the last image input process STn, and a storage process Kn for the compressed image data are terminated, a display process H for the image corresponding to the last image data is performed.

A small amount of time seems to exist between the last image input process STn and the display process H. However, as is evident from the comparison with FIG. 5, the time required for the flow 64 of the input image data processes in FIG. 14 is shortened, because the rotation 22 and the image compression 23 in FIG. 5 are simultaneously performed, and the intermediate display 25 does not made in FIG. 14. Accordingly, a user does not almost need to worry about a waiting time until the last display process H, since the time required for the flow 64 of the input image data processes is shortened, and the image input processes ST1 to STn are successively performed and terminated.

Furthermore, in FIG. 14B, if an image is a erect image or a erect and mirror-reversed image like FIG. 4A or 4E, the flow 64 of the input image data processes can be immediately started with an input of scanned data of several initial lines in the flow 63 of the image input processes without waiting for the completion of the storage of the entire image data in the buffer memory 46. Therefore, the waiting time from the last image input to its display process is further shortened.

What is claimed is:

1. An image inputting apparatus, comprising:
an image inputting unit inputting image data;
a temporary storing unit temporarily storing the image data input by said image inputting unit;
an image compressing unit reading the image data stored in said temporary storing unit, and compressing the image data, and
an image state detecting unit detecting a rotation direction and presence/absence of mirror reversing of image data, wherein
said image state detecting unit detects a rotation direction and presence/absence of mirror reversing of an image from the image data input by said image inputting unit: and
said image compressing unit scans the image data in a pixel order which cancels the rotation direction and the mirror reversing of the image data, which are detected by said image state detecting unit, and compresses the image data.

2. The image inputting apparatus according to claim 1, further comprising:
a storing unit storing image data; and
a controlling unit controlling said image inputting unit, said image compressing unit, and said storing unit, wherein
said controlling unit performs a control that a compression process of image data, which is performed by said image compressing unit, and a storage process of compressed image data, which is performed by said storing unit, are executed in parallel with an input process of the image data, which is performed by said image inputting unit.

3. The image inputting apparatus according to claim 1, further comprising
a displaying unit displaying an image based on the image data, wherein said controlling unit performs a control for making said displaying unit display only an image based on image data, for which an input process is lastly performed, after a series of input processes of image data is terminated by said image inputting unit.

4. The image inputting apparatus according to claim 2, wherein
said controlling unit performs a control that the input process of image data, which is performed by said image inputting unit, is executed with higher priority than the compression process of image data, which is performed by said image compressing unit, and the storage process of compressed image data, which is performed by said storing unit.

5. An image inputting method, comprising:
inputting image data;
temporarily storing the input image data;
reading the temporarily stored image data,
compressing the image data; and
detecting a rotation direction and presence/absence of mirror reversing of image data, wherein
at the time of detection, the rotation direction and the presence/absence of mirror reversing of an image are detected from input image data; and
at the time of image data compression, the image data is scanned in a pixel order which cancels the detected rotation direction and mirror reversing of the image data, and the image data is compressed.

6. The image inputting method according to claim 5, further comprising:
storing image data; and
controlling an input of the image data, compression of the image data, and storage of the image data, wherein
at the time of a control, a control that the image data is compressed, and the compressed image data is stored in parallel with the input of the image data is performed.

7. The image inputting method according to claim 5, further comprising
displaying an image based on the image data, wherein
at the time of a control, a control that only an image based on image data, for which an input process is lastly performed, is displayed after a series of input processes of the image data is terminated is performed.

8. The image inputting method according to claim 6, wherein
at the time of the control, a control that the input of image data is performed with higher priority than the compression of the image data, and the storage of the compressed image data is performed.

9. A computer readable storage medium on which is recorded an image inputting program for causing a CPU of a scanner device or an image capturing device, or a CPU of an information processing device fixed to or attached/detached freely to/from the scanner device or the image capturing device to execute a process, the process comprising:
inputting image data;
temporarily storing the input image data;
reading the temporarily stored image data;
compressing the image data; and
detecting a rotation direction and presence/absence of mirror reversing of image data, wherein at the time of detection, the rotation direction and the presence/absence of mirror reversing of an image are detected from input image data; and at the time of image data compression, the image data is scanned in a pixel order which cancels the detected rotation direction and mirror reversing of the image data, and the image data is compressed.

10. The computer readable storage medium according to claim 9, the process further comprising: storing image data; and controlling an input of the image data, compression of the image data, and storage of the image data, wherein at the time of a control, a control that the image data is compressed, and the compressed image data is stored in parallel with the input of the image data is performed.

11. The computer readable storage medium according to claim 9, the process further comprising displaying an image based on the image data, wherein at the time of a control, a control that only an image based on image data, for which an input process is lastly performed, is displayed after a series of input processes of the image data is terminated is performed.

12. The computer readable storage medium according to claim 10, wherein at the time of the control, a control that the input of image data is performed with higher priority than the compression of the image data, and the storage of the compressed image data is performed.

* * * * *

UNITED STATES PATENT AND TRADEMARK OFFICE
CERTIFICATE OF CORRECTION

PATENT NO. : 7,355,762 B2  Page 1 of 1
APPLICATION NO. : 10/448017
DATED : April 8, 2008
INVENTOR(S) : Kenichiro Sakai et al.

It is certified that error appears in the above-identified patent and that said Letters Patent is hereby corrected as shown below:

Column 13, Line 44, change "unit:" to --unit;--.

Signed and Sealed this

Nineteenth Day of August, 2008

JON W. DUDAS
*Director of the United States Patent and Trademark Office*